(12) United States Patent
Nakase

(10) Patent No.: US 10,767,694 B2
(45) Date of Patent: Sep. 8, 2020

(54) MANUFACTURING METHOD FOR SLIDING MEMBER AND SLIDING MEMBER

(71) Applicant: KYB Corporation, Tokyo (JP)

(72) Inventor: Takuya Nakase, Tokyo (JP)

(73) Assignee: KYB CORPORATION, Tokyo (JP)

( * ) Notice: Subject to any disclaimer, the term of this patent is extended or adjusted under 35 U.S.C. 154(b) by 0 days.

(21) Appl. No.: 16/475,907

(22) PCT Filed: Mar. 5, 2018

(86) PCT No.: PCT/JP2018/008323
§ 371 (c)(1),
(2) Date: Jul. 3, 2019

(87) PCT Pub. No.: WO2018/173719
PCT Pub. Date: Sep. 27, 2018

(65) Prior Publication Data
US 2019/0345979 A1 Nov. 14, 2019

(30) Foreign Application Priority Data
Mar. 23, 2017 (JP) ................. 2017-057276

(51) Int. Cl.
F16C 33/06 (2006.01)
F16C 33/12 (2006.01)
F16C 29/02 (2006.01)

(52) U.S. Cl.
CPC ............ F16C 33/121 (2013.01); F16C 29/02 (2013.01)

(58) Field of Classification Search
CPC ...... F16C 33/12; F16C 33/121; F16C 33/124; F16C 33/125; F16C 2223/70; C25D 11/02; C25D 11/022; C25D 11/024; C25D 11/026; C25D 11/30; C25D 11/34; C25D 15/00; C25D 15/02; C25D 11/04
See application file for complete search history.

(56) References Cited

U.S. PATENT DOCUMENTS

| 3,454,472 A * | 7/1969 | Giuffrida ................ C25B 11/16 205/188 |
| 5,952,110 A | 9/1999 | Schell et al. |
| 2010/0183254 A1* | 7/2010 | Jensen .................. F16C 33/043 384/279 |

(Continued)

FOREIGN PATENT DOCUMENTS

| GB | 2290598 A | 1/1996 |
| JP | S59166464 A | 9/1984 |

(Continued)

Primary Examiner — Phillip A Johnson
(74) Attorney, Agent, or Firm — Rabin & Berdo, P.C.

(57) ABSTRACT

A manufacturing method for a sliding member is a method for manufacturing the sliding member in which a surface of an oxide film covering a metal base material serves as a sliding surface, and includes a dispersion step for dispersing a plurality of hard particles having a higher hardness than the oxide film through a surface layer of the metal base material, an oxide film generation step for generating the oxide film on the surface of the metal base material after the dispersion step, and an exposure step for exposing some of the plurality of hard particles from the surface of the oxide film by partially removing the oxide film.

3 Claims, 6 Drawing Sheets

(56) References Cited

U.S. PATENT DOCUMENTS

| | | | |
|---|---|---|---|
| 2011/0214993 A1* | 9/2011 | Akana | C25D 5/00 |
| | | | 205/50 |
| 2013/0153428 A1* | 6/2013 | Akana | C25D 11/20 |
| | | | 205/50 |
| 2014/0076263 A1* | 3/2014 | Sato | C25D 11/005 |
| | | | 123/193.6 |
| 2016/0024680 A1 | 1/2016 | Browning et al. | |

FOREIGN PATENT DOCUMENTS

| | | |
|---|---|---|
| JP | H06-26571 A | 2/1994 |
| JP | H07-310588 A | 11/1995 |
| JP | H08-209389 A | 8/1996 |
| JP | H09-144877 A | 6/1997 |
| JP | 2006-258149 A | 9/2006 |
| JP | 2010209411 A | 9/2010 |

\* cited by examiner

MANUFACTURING METHOD FOR SLIDING MEMBER AND SLIDING MEMBER

TECHNICAL FIELD

The present invention relates to a manufacturing method for a sliding member and a sliding member.

BACKGROUND ART

Improving the wear resistance of a sliding contact part of a shift operation member by forming an oxide film on the surface of the sliding contact part has been proposed (see JPH9-144877A and JP2006-258149A). A hard alumite film (a hard anodized film) is formed on the surface of a shift operation member described in JPH9-144877A by hard alumite (hard anodization) treatment. An oxide film is formed on the surface of a shift operation member described in JP2006-258149A by plasma electrolytic oxidation (PEO) treatment.

SUMMARY OF INVENTION

In a hydraulic device such as a hydraulic pump or a hydraulic motor, however, a high load is applied, and therefore sufficient wear resistance may not be obtained simply by forming an oxide film on the surface of a sliding member used in the hydraulic device through anodization treatment or plasma electrolytic oxidation treatment.

An object of the present invention is to improve the wear resistance of a sliding member.

According to one aspect of the present invention, a manufacturing method for a sliding member in which a surface of an oxide film covering a metal base material serves as a sliding surface, the manufacturing method includes a dispersion step for dispersing a plurality of hard particles having a higher hardness than the oxide film through a surface layer of the metal base material, an oxide film generation step for generating the oxide film on the surface of the metal base material after the dispersion step, and an exposure step for exposing some of the plurality of hard particles from the surface of the oxide film by partially removing the oxide film.

According to another aspect of the present invention, a sliding member in which a surface of an oxide film covering a metal base material serves as a sliding surface. A plurality of hard particles having a higher hardness than the oxide film are dispersed through the oxide film. Some of the plurality of hard particles are exposed from the surface of the oxide film. A ratio of a volume of the hard particles to a unit volume of the oxide film is greater than a ratio of the volume of the hard particles to a unit volume of the metal base material.

DESCRIPTION OF EMBODIMENTS

An embodiment of the present invention will now be described with reference to the figures.

Figure 1:
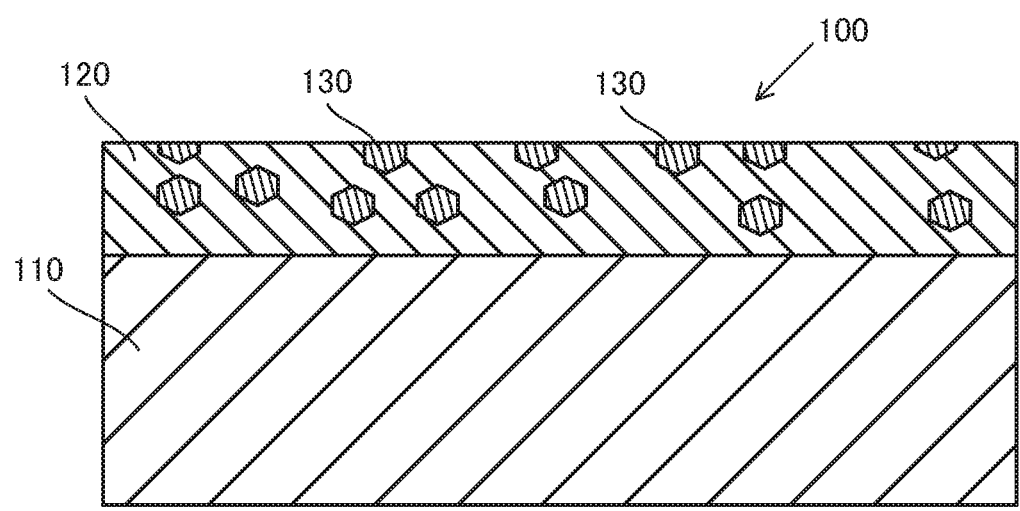
FIG. 1 is a schematic sectional view showing a configuration of a sliding member according to an embodiment of the present invention.

FIG. 1 is a schematic sectional view showing a configuration of a sliding member 100 according to this embodiment of the present invention. As shown in FIG. 1, the sliding member 100 is configured such that a metal base material 110 is covered by an oxide film 120. A plurality of hard particles 130 are dispersed through the oxide film 120. Some of the plurality of hard particles 130 are exposed from the surface of the oxide film 120. It should be noted that in the figures, the thickness of the oxide film 120 and the particle size of the hard particles 130 are shown to be larger than reality.

The metal base material 110 is a material with which the oxide film 120 can be generated on the surface of the metal base material 110 by anodization treatment or plasma electrolytic oxidation treatment. The metal base material 110 is selected from aluminum alloy, magnesium, and titanium alloy, for example.

The hard particles 130 have a higher hardness (Vickers hardness Hv) than the oxide film 120. The hard particles 130 are selected from aluminum oxide ($Al_2O_3$), silicon carbide (SiC), and diamond, for example. When aluminum oxide, or in other words alumina, is employed, the Vickers hardness Hv thereof is between approximately 1800 and 2000. When silicon carbide is employed, the Vickers hardness Hv thereof is between approximately 2200 and 2400. When diamond is employed, the Vickers hardness Hv thereof is approximately 10000.

Figure 2:
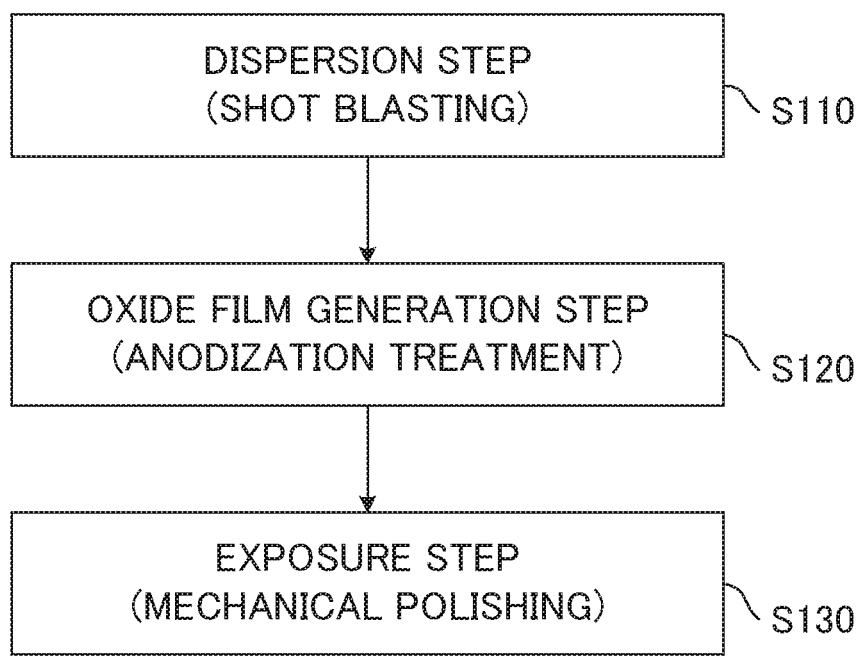
FIG. 2 is a flowchart showing procedures for manufacturing the sliding member.

A method for manufacturing the sliding member 100 according to this embodiment will now be described. FIG. 2 is a flowchart showing procedures for manufacturing the sliding member 100. As shown in FIG. 2, the method for manufacturing the sliding member 100 includes a dispersion step S110, an oxide film generation step S120, and an exposure step S130.

An example in which aluminum alloy having a Vickers hardness Hv of approximately 100 is employed as the metal base material 110 and the oxide film 120 is generated by anodization treatment will be described below. It should be noted that a material having a greater hardness than the hardness (a Vickers hardness Hv of approximately 500, for example) of the oxide film 120 generated on the surface of the aluminum alloy is selected as the material of the hard particles 130.

—Dispersion Step—

Figure 3A:
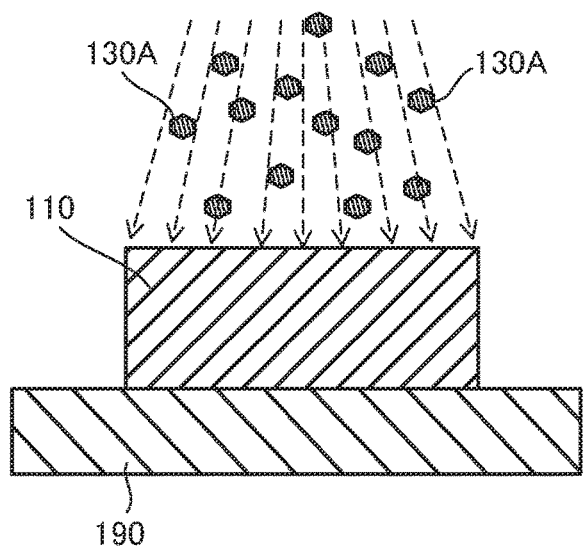
FIG. 3A is a view illustrating a dispersion step, shows a state before hard particles are dispersed through a metal base material.
Figure 3B:
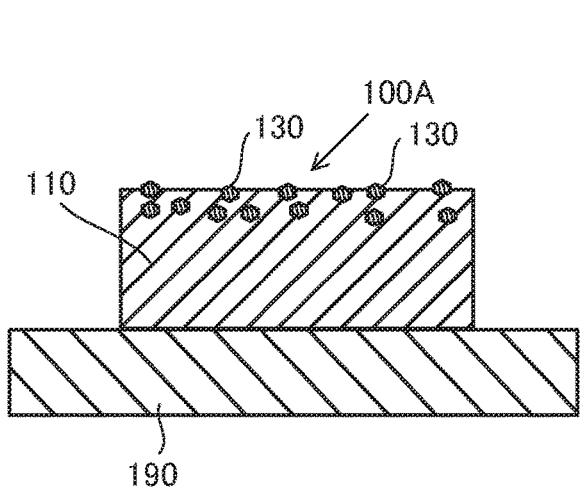
FIG. 3B is a view illustrating a dispersion step, shows a state after the hard particles have been dispersed through the metal base material.

FIGS. 3A and 3B are view illustrating the dispersion step S110. FIG. 3A shows a state before the hard particles 130 are dispersed through the metal base material 110. FIG. 3B shows a state after the hard particles 130 have been dispersed through the metal base material 110. As shown in FIGS. 3A and 3B, in the dispersion step S110, abrasive grains (loose abrasive grains) 130A are caused to collide with the metal base material 110 by loose abrasive machining, whereby the abrasive grains 130A are smashed to pieces and thus dispersed through a surface layer of the metal base material 110 as the hard particles 130. In this embodiment, the plurality of hard particles 130 are dispersed through the surface layer of the metal base material 110 by shot blasting (projection processing), which is a type of loose abrasive machining.

As shown in FIG. 3A, the metal base material 110 is disposed on a table 190 in a projection chamber, whereupon the abrasive grains (the projection material) 130A are blasted toward the metal base material 110 through a blasting port of a blasting device (not shown).

The abrasive grains 130A are smashed into small pieces when they collide with the metal base material 110, and as shown in FIG. 3B, are thus dispersed through the surface layer of the metal base material 110 as the hard particles 130. The hardness (a Vickers hardness of approximately 100, for example) of the metal base material 110 is lower than the hardness (a Vickers hardness of at least 1000, for example) of the hard particles 130. Therefore, the hard particles 130 are embedded in the surface layer of the metal base material 110, or in other words a range extending to a predetermined depth (approximately 5 to 10 μm, for example) from the surface. It should be noted that some of the plurality of hard particles 130 project outward from the surface of the metal base material 110. At the end of the dispersion step S110, a material (referred to hereafter as an intermediate material 100A) in a state where the plurality of hard particles 130 are dispersed through the metal base material 110 is formed.

When the particle size of the hard particles 130 is too large, growth of the oxide film 120 during the oxide film generation step S120, to be described below, is impaired. Therefore, the size of the abrasive grains 130A and blasting conditions such as the blasting speed, the blasting angle, and the blasting amount are set so that the particle size of the hard particles 130 embedded in the surface layer of the metal base material 110 during the dispersion step S110 is less than approximately 5 μm, and preferably no more than 3 μm.

—Oxide Film Generation Step—

Figure 4A:
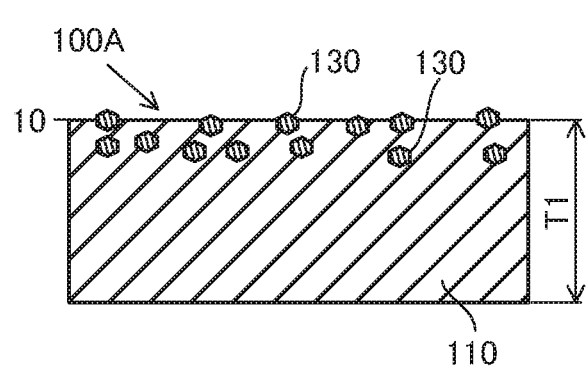
FIG. 4A is a view illustrating an oxide film generation step, shows a state prior to generation of the oxide film.
Figure 4B:
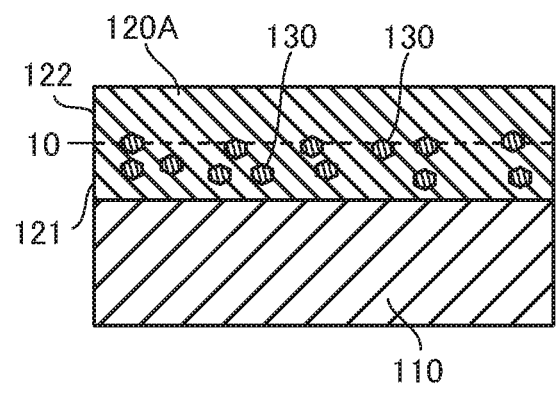
FIG. 4B is a view illustrating an oxide film generation step, shows a state following generation of the oxide film.

FIGS. 4A and 4B are view illustrating the oxide film generation step S120. FIG. 4A shows a state prior to generation of an oxide film 120A. FIG. 4B shows a state following generation of the oxide film 120A. As shown in FIGS. 4A and 4B, the oxide film generation step S120 is a step for generating the oxide film 120A on the surface of the metal base material 110 after the dispersion step S110. In this embodiment, the oxide film 120A is generated at a predetermined thickness by executing anodization treatment under predetermined conditions. The thickness of the oxide film 120A is set at no less than 5 μm, and is adjusted so that the hard particles 130 dispersed through the surface layer of the metal base material 110 are incorporated into the oxide film 120A.

In the anodization treatment, aluminum oxide is generated by melting the surface of the metal base material 110. Accordingly, the oxide film 120A also grows on the inside of the metal base material 110. Here, as shown in FIG. 4A, a position on the surface of the metal base material 110 prior to the anodization treatment is defined as a reference position 10. As shown in FIG. 4B, the oxide film 120A can be divided into a layer (referred to hereafter as an inside growth layer) 121 on the lower side (the inner side of the pre-treatment metal base material) of the reference position 10 (see the short dashes line in the figure) and a layer (referred to hereafter as an outside growth layer) 122 on the upper side (the outer side of the pre-treatment metal base material) of the reference position 10.

When the oxide film 120A grows, the plurality of hard particles 130 embedded in the surface layer of the metal base material 110 are incorporated into the oxide film 120A. In this embodiment, conditions of the anodization treatment are set so that all of the hard particles 130 embedded in the metal base material 110 are incorporated into the oxide film 120A. In the oxide film 120A generated in this manner, the plurality of hard particles 130 exist in the inside growth layer 121. On the other hand, almost none of the hard particles 130 exist in the outside growth layer 122.

—Exposure Step—

Figure 5A:
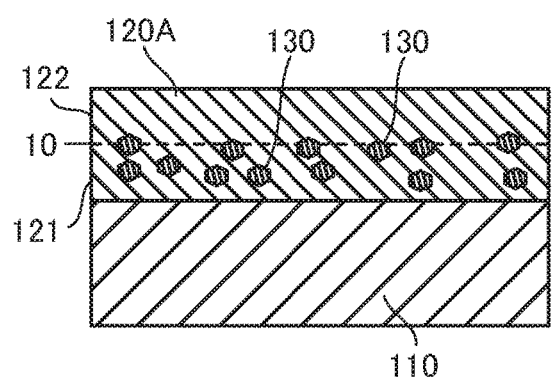
FIG. 5A is a view illustrating an exposure step, shows a state before the surface of the oxide film covering the metal base material is polished.
Figure 5B:
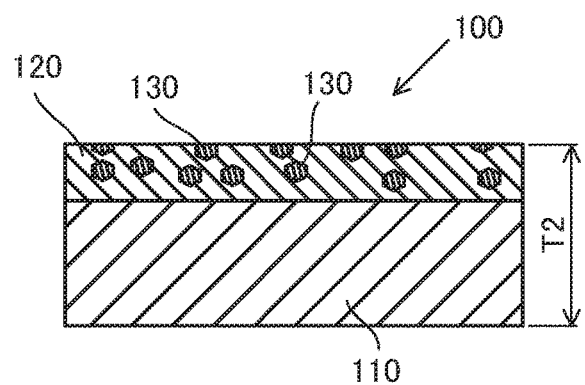
FIG. 5B is a view illustrating an exposure step, shows a state after the surface of the oxide film covering the metal base material is polished.

FIGS. 5A and 5B are view illustrating the exposure step S130. FIG. 5A shows a state before the surface of the oxide film 120A covering the metal base material 110 is polished. FIG. 5B shows a state after the surface of the oxide film 120 covering the metal base material 110 is polished. As shown in FIGS. 5A and 5B, the exposure step S130 is a step performed after the oxide film generation step S120 to partially remove the oxide film 120A so that some of the plurality of hard particles 130 are exposed from the surface of the oxide film 120. In this embodiment, the surface of the oxide film 120A is mechanically removed up to a predetermined depth by mechanical polishing. Examples of mechanical polishing include lapping, honing, polishing, and so on.

The thickness (depth) by which the oxide film 120A is removed in the exposure step S130 is equal to or greater than the thickness that is added by the oxide film generation step S120. More specifically, in the exposure step S130, at least the outside growth layer 122 is removed such that the inside growth layer 121 is exposed. In other words, the thickness to be removed is set such that a thickness T2 (see FIG. 5B) of the sliding member 100 obtained following the exposure step S130 is equal to or smaller than a thickness T1 (see FIG. 4A) of the metal base material 110 within the intermediate material 100A (T2 T1). As a result, some of the plurality of hard particles 130 dispersed through the oxide film 120 are exposed.

The thickness of the oxide film 120 following partial removal of the oxide film 120A in the exposure step S130 is set at a larger dimension than the particle size of the hard particles 130 dispersed through the oxide film 120. The thickness of the oxide film 120 is set at no less than 5 μm and no more than 30 μm, for example.

As shown in FIG. 5B, the particle size of the hard particles 130 is smaller than the thickness of the oxide film 120, and therefore the individual hard particles 130 do not straddle the surface of the oxide film 120 and an interface between the oxide film 120 and the metal base material 110. In other words, the individual hard particles 130 are dispersed through the oxide film 120 so as to be either completely enveloped by the oxide film 120 or partially exposed from the surface of the oxide film 120.

Thus, the sliding member 100 is formed such that the surface of the oxide film 120 covering the metal base material 110 serves as a sliding surface. It should be noted that in this embodiment, mechanical polishing is implemented so that the surface of the oxide film 120 is flush with the exposed surfaces of the hard particles 130 that are exposed from the surface. The sliding surface is finished to a ten-point average roughness Rz of no more than 1 μm.

As described above, in the oxide film generation step S120 according to this embodiment, anodization treatment is performed so that all of the hard particles 130 embedded in the metal base material 110 are incorporated into the oxide film 120. Hence, in the formed sliding member 100, the hard particles 130 are included only in the oxide film 120 and not in the metal base material 110. In other words, a ratio of the volume of the hard particles 130 to a unit volume of the oxide film 120 is greater than a ratio (0%) of the volume of the hard particles 130 to a unit volume of the metal base material 110.

The sliding member 100 formed in this manner is used, for example, as a sliding member of a hydraulic device such as a valve plate or a cylinder block of a piston-type hydraulic pump or hydraulic motor, not shown in the figures.

According to the embodiment described above, the following actions and effects are obtained.

(1) The method of manufacturing the sliding member 100 includes the dispersion step S110 for dispersing the plurality of hard particles 130, which have a higher hardness than the oxide film 120, through the surface layer of the metal base material 110, the oxide film generation step S120 for generating the oxide film 120A on the surface of the metal base material 110 after the dispersion step S110, and the exposure step S130 for exposing some of the plurality of hard particles 130 from the surface of the oxide film 120 by partially removing the oxide film 120A.

Hence, the sliding member 100 is obtained by dispersing the plurality of hard particles 130, which have a higher hardness than the oxide film 120, through the oxide film 120 and exposing some of the plurality of hard particles 130 from the surface of the oxide film 120. In the dispersion step S110, the hard particles 130 are dispersed through the surface layer of the metal base material 110, and therefore the ratio of the volume of the hard particles 130 to a unit volume of the oxide film 120 is larger than the ratio of the volume of the hard particles 130 to a unit volume of the metal base material 110. According to this embodiment, a load from a partner member that slides on the sliding member 100 can be supported by the oxide film 120 and the hard particles 130 dispersed through the oxide film 120, and therefore wear on the oxide film 120 can be prevented from advancing. As a result, the wear resistance of the sliding member 100 can be improved.

(2) In the exposure step S120, the thickness by which the oxide film 120A is removed equals or exceeds the thickness added by the oxide film generation step S120. More of the hard particles 130 can thus be exposed, and as a result, the wear resistance can be improved.

(3) In the intermediate material 100A, some of the plurality of hard particles 130 project outward from the surface of the metal base material 110. Hence, by removing a thickness that equals or exceeds the thickness added by the oxide film generation step S120, or in other words removing at least the entire outside growth layer 122, some of the plurality of hard particles 130 dispersed through the oxide film 120 can reliably be exposed. According to this embodiment, therefore, dimension management can be performed easily during the operation for partially removing the oxide film 120A so that some of the plurality of hard particles 130 are exposed from the surface of the oxide film 120, and as a result, an improvement in work efficiency can be achieved.

(4) In the dispersion step S110, the abrasive grains 130A are caused to collide with the metal base material 110 by loose abrasive machining, whereby the abrasive grains 130A are smashed to pieces and thus dispersed through the surface layer of the metal base material 110 as the hard particles 130. Hence, the plurality of hard particles 130 can be dispersed through the metal base material 110 more effectively than with fixed abrasive machining, and therefore favorable work efficiency is obtained.

(5) The metal base material 110 is a material with which the oxide film 120A can be generated on the surface of the metal base material 110 by anodization treatment. In the oxide film generation step S120, therefore, the oxide film 120A can be generated on the surface of the metal base material 110 by anodization treatment. As a result, the oxide film 120A can easily be generated at a predetermined thickness so that the plurality of hard particles 130 are incorporated into the oxide film 120A.

(6) In the anodization treatment, the surface layer of the intermediate material 100A is dissolved so that the generated oxide film 120A is incorporated into the intermediate material 100A, and therefore a film that is less likely to peel than a film formed by plating or the like can be generated.

(7) According to this embodiment, in the dispersion step S110, the plurality of hard particles 130 having a higher hardness than the oxide film 120 are dispersed only through the surface layer of the metal base material 110, and therefore the work process can be shortened in comparison with a case where the metal base material 110 is dissolved such that the hard particles 130 are dispersed through the entire metal base material 110.

(8) In the sliding member 100, the hard particles 130 are included only in the oxide film 120, and no hard particles 130 are included in the meal base material 110. As a result, variation in material characteristics of the metal base material 110 can be prevented.

The following modified examples are also included in the scope of the present invention, and configurations illustrated in the modified examples may be combined with the configurations of the embodiment described above. Moreover, configurations described below in different modified examples may be combined with each other.

Modified Example 1

In the above embodiment, procedures for manufacturing the sliding member 100 were described in detail, using a case in which the oxide film 120A is generated on the surface of the metal base material 110 by anodization treatment as a representative example. The present invention is not limited thereto, however, and instead, for example, the oxide film 120A may be generated on the surface of the metal base material 110 by plasma electrolytic oxidation treatment. In this case, the oxide film 120A can be set at no less than 5 μm and no more than 200 μm, for example. It should be noted that the oxide film 120A, when generated by plasma electrolytic oxidation treatment, has a Vickers hardness Hv of approximately 2000, for example. Accordingly, either silicon carbide or diamond, both of which are harder than the oxide film 120A, is employed as the material of the hard particles 130. With plasma electrolytic oxidation treatment, similar actions and effects to the actions and effects obtained with the anodization treatment described above can be obtained.

Modified Example 2

In the above embodiment, an example in which the thickness by which the oxide film 120A is removed during the exposure step S130 equals or exceeds the thickness added by the oxide film generation step S120 was described, but the present invention is not limited thereto, and the thickness by which the oxide film 120A is removed during the exposure step S130 may be less than the thickness added by the oxide film generation step S120. In this case, the thickness T2 (see FIG. 5B) of the sliding member 100 is greater than the thickness T1 (see FIG. 4A) of the metal base material 110 within the intermediate material 100A (T2>T1). By partially removing the oxide film 120A at least so that some of the plurality of hard particles 130 are exposed from the surface of the oxide film 120, the wear resistance of the sliding member 100 can be improved. Moreover, in this modified example, the oxide film 120 is thicker than in the above embodiment, and therefore the life of the sliding member 100 can be increased.

Modified Example 3

Figure 6:
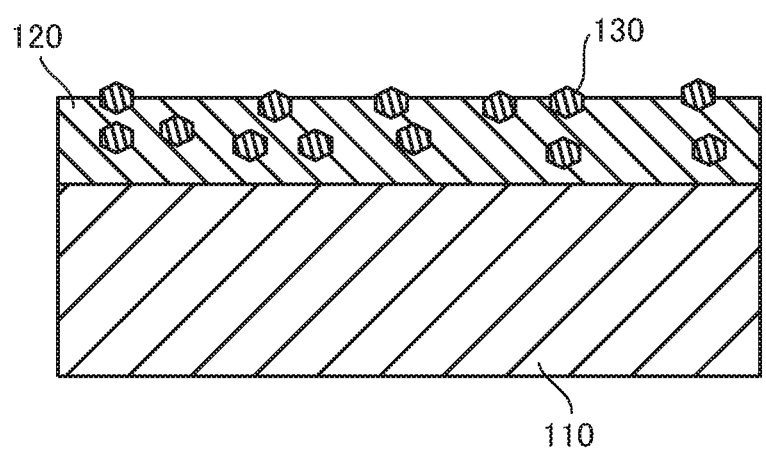
FIG. 6 is a schematic sectional view showing a configuration of a sliding member according to a modified example of this embodiment of the present invention.

In the above embodiment, an example in which mechanical polishing is implemented during the exposure step S130 so that the exposed surfaces of the hard particles 130 are flush with the surface of the oxide film 120 was described, but the present invention is not limited thereto. As shown in FIG. 6, the oxide film 120A may be partially removed so that some of the hard particles 130 project outward from the oxide film 120. By actively causing some of the hard particles 130 to project from the oxide film 120, the load from the partner member that slides on the sliding member 100 can be supported mainly by the plurality of projecting hard particles 130, and therefore the advancement of wear on the oxide film 120 can be prevented effectively. In other words, the wear resistance of the sliding member 100 can be further improved.

Modified Example 4

In the above embodiment, shot blasting (projection processing) was described as an example of loose abrasive machining, but the present invention is not limited thereto, and the hard particles 130 may be embedded in the surface layer of the metal base material 110 by wet lapping, which is a type of loose abrasive machining.

Modified Example 5

In the above embodiment, an example in which the hard particles 130 are dispersed through the surface layer of the metal base material 110 in the dispersion step S110 by loose abrasive machining was described, but the present invention is not limited thereto, and instead, abrasive grains may be dispersed through the surface layer of the metal base material 110 as the hard particles 130 by fixed abrasive machining using a whetstone to which the abrasive grains are fixed. In this case, the hard particles 130 can be dispersed effectively through the surface of the metal base material 110 by dressing the whetstone appropriately. In fixed abrasive machining, dressing must be implemented at an appropriate timing using an appropriate method, whereas in loose abrasive machining, no dressing operation is required, therefore the work efficiency with which the hard particles 130 are dispersed is higher than with fixed abrasive machining.

Modified Example 6

In the above embodiment, aluminum oxide ($Al_2O_3$), silicon carbide (SiC), and diamond are cited as examples of the hard particles 130, but the present invention is not limited thereto, and various hard particles 130 having a higher Vickers hardness than the oxide film 120 can be employed.

As a guide, the employed hard particles 130 preferably have a Vickers hardness Hv of at least 1000.

Modified Example 7

In the above embodiment, an example in which, during the exposure step S130, the oxide film 120A is partially removed by mechanical polishing so that some of the plurality of hard particles 130 are exposed from the surface of the oxide film 120 was described. However, the present invention is not limited thereto, and instead, some of the plurality of hard particles 130 may be exposed by chemically dissolving a part of the oxide film 120A through chemical etching or the like.

Modified Example 8

In the above embodiment, an example in which the ratio of the volume of the hard particles 130 to a unit volume of the metal base material 110 is 0% was described, but the present invention is not limited thereto, and as long as at least the ratio of the volume of the hard particles 130 to a unit volume of the oxide film 120 is greater than the ratio of the volume of the hard particles 130 to a unit volume of the metal base material 110, the ratio of the volume of the hard particles 130 to a unit volume of the metal base material 110 may be approximately 10%.

The configurations, actions, and effects of this embodiment of the present invention are summarized below.

The manufacturing method for the sliding member 100 is a method for manufacturing the sliding member 100 in which the surface of the oxide film 120 covering the metal base material 110 serves as a sliding surface, and includes the dispersion step S110 for dispersing the plurality of hard particles 130 having a higher hardness than the oxide film 120 through the surface layer of the metal base material 110, the oxide film generation step S120 for generating the oxide film 120A on the surface of the metal base material 110 after the dispersion step S110, and the exposure step S130 for exposing some of the plurality of hard particles 130 from the surface of the oxide film 120 by partially removing the oxide film 120A.

According to this configuration, the load from the partner member that slides on the sliding member 100 can be supported by the oxide film 120 and the hard particles 130 dispersed through the oxide film 120, and therefore wear on the oxide film 120 can be prevented from advancing. As a result, the wear resistance of the sliding member 100 can be improved.

In the manufacturing method for the sliding member 100, the thickness by which the oxide film 120A is removed in the exposure step S130 equals or exceeds the thickness added by the oxide film generation step S120.

According to this configuration, by removing the oxide film 120A by a thickness that equals or exceeds the thickness added by the oxide film generation step S120, more of the hard particles 130 can be exposed, and as a result, the wear resistance can be improved.

In the manufacturing method for the sliding member 100, the abrasive grains 130A are dispersed through the surface layer of the metal base material 110 as the hard particles 130 in the dispersion step S110 by loose abrasive machining.

According to this configuration, the plurality of hard particles 130 can be dispersed through the metal base material 110 more effectively than with fixed abrasive machining, and as a result, favorable work efficiency is obtained.

In the oxide film generation step S120 of the manufacturing method for the sliding member 100, the oxide film 120A is generated on the surface of the metal base material 110 by anodization treatment or plasma electrolytic oxidation treatment.

According to this configuration, the oxide film 120A can be generated easily at a predetermined thickness such that the plurality of hard particles 130 are incorporated into the oxide film 120A.

The sliding member 100 is a sliding member in which the surface of the oxide film 120 covering the metal base material 110 serves as a sliding surface, wherein the plurality of hard particles 130 having a higher hardness than the oxide film 120 are dispersed through the oxide film 120, some of the plurality of hard particles 130 are exposed from the surface of the oxide film 120, and the ratio of the volume of the hard particles 130 to a unit volume of the oxide film 120 is greater than the ratio of the volume of the hard particles 130 to a unit volume of the metal base material 110.

According to this configuration, the load from the partner member that slides on the sliding member 100 can be supported by the oxide film 120 and the hard particles 130 dispersed through the oxide film 120, and therefore wear on the oxide film 120 can be prevented from advancing. As a result, the wear resistance of the sliding member 100 can be improved.

In the sliding member 100, the hard particles 130 are included only in the oxide film 120 and not in the metal base material 110.

According to this configuration, variation in the material characteristics of the metal base material 110 can be prevented.

In the sliding member 100, the metal base material 110 is a material with which the oxide film 120A can be generated on the surface of the metal base material 110 by anodization treatment or plasma electrolytic oxidation treatment.

Since the oxide film 120A can be generated on the surface of the metal base material 110 by anodization treatment or plasma electrolytic oxidation treatment, the oxide film 120A can be generated easily at a predetermined thickness such that the plurality of hard particles 130 are incorporated into the oxide film 120A.

Embodiments of this invention were described above, but the above embodiments are merely examples of applications of this invention, and the technical scope of this invention is not limited to the specific constitutions of the above embodiments.

This application claims priority based on Japanese Patent Application No. 2017-057276 filed with the Japan Patent Office on Mar. 23, 2017, the entire contents of which are incorporated into this specification by reference.

The invention claimed is:

1. A manufacturing method for a sliding member in which a surface of an oxide film covering a metal base material serves as a sliding surface, the manufacturing method comprising:
    a dispersion step for dispersing a plurality of hard particles having a higher hardness than the oxide film through a surface layer of the metal base material;
    an oxide film generation step for generating the oxide film on the surface of the metal base material after the dispersion step; and
    an exposure step for exposing some of the plurality of hard particles from the surface of the oxide film by partially removing the oxide film.

2. The manufacturing method for a sliding member according to claim 1, wherein, in the dispersion step, abrasive grains are dispersed through the surface layer of the metal base material as the hard particles by loose abrasive machining.

3. The manufacturing method for a sliding member according to claim 1, wherein, in the oxide film generation step, the oxide film is generated on the surface of the metal base material by anodization treatment or plasma electrolytic oxidation treatment.

* * * * *